Patented June 21, 1938

2,121,483

UNITED STATES PATENT OFFICE 2,121,483

PROCESS FOR THE PRODUCTION OF CIS-ANDROSTERONE

Russell Earl Marker, State College, Pa., assignor to Parke, Davis & Company, Detroit, Mich., a corporation of Michigan No Drawing. Application April 13, 1936, Serial No. 74,224

3 Claims. (Cl. 260—131)

This invention relates to the production of compounds possessing male sex hormone activity, and in particular the conversion of trans-androsterone into cis-androsterone.

It is known that cis-androsterone is more potent physiologically than is the trans-isomer. Consequently since the latter may be produced more readily in the laboratory, a convenient method for conversion of one isomer into the other is of distinct practical value.

In my co-pending application it is shown that when beta-cholestanol is treated with phosphorus pentachloride, beta-cholestyl chloride is obtained, whereas when treated with thionyl chloride, the alpha-form of cholestyl chloride is produced. I have now used the same type of Walden inversion in order to convert one form of androsterone into the other. I have found that trans-androsterone on treatment with thionyl chloride gives alpha-chloroandrosterone which on gentle hydrolysis yields cis-androsterone. This conversion is illustrated by the following formulas:

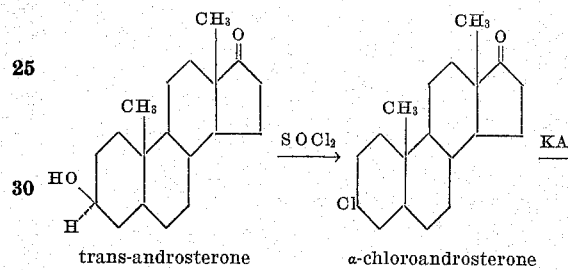

trans-androsterone   α-chloroandrosterone

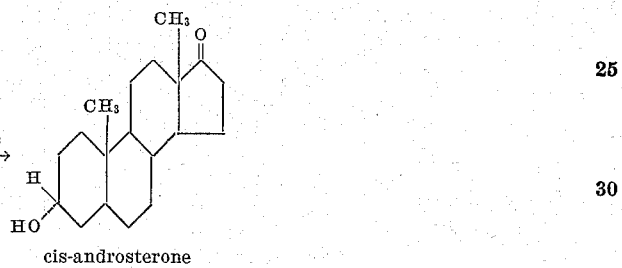

cis-androsterone

*Preparation of alpha - 3 - chloroandrosterone from trans-androsterone.*—10 grams of trans-androsterone is treated with 50 cc. of thionyl chloride and allowed to stand overnight. Water is then added to decompose the excess thionyl chloride and the product extracted with ether. The ether solution is shaken with sodium carbonate solution, treated with decolorizing charcoal and the ether evaporated. The residue is crystallized from methyl alcohol, M. 167–169°. A mixed melting-point with α-chloroandrosterone obtained by other methods showed no depression.

Analysis: Calc. for $C_{19}H_{29}OCl$, C, 73.9; H, 9.5; Found C, 74.4; H, 9.7.

*Hydrolysis of alpha-3-chloroandrosterone to cis-androsterone.*—6 grams of 3-chloroandrosterone is treated with 8 g. of potassium acetate and 30 cc. of n-valeric acid and refluxed in a bath at 200° for 14 hours. It is cooled and 15 g. of sodium hydroxide in 30 cc. of water added slowly. To this is added 200 cc. of 95% alcohol. The product again is refluxed during two hours after which most of the alcohol is distilled off under reduced pressure. Water is added and the product extracted with ether. The ether is evaporated and the residue dried thoroughly. To this are added 8 g. of succinic anhydride and 12 cc. of pyridine. The mixture is heated at 100° during one hour. It is taken up in ether, shaken with dilute HCl, and then with water. The etheral solution is then washed three times with sodium carbonate solution and this solution extracted with ether, 10 g. of sodium hydroxide in 25 cc. of water being added to the aqueous layer. It is heated two hours on a steam bath. The androsterone is extracted with ether, treated with norit in methyl alcohol, then crystallized from 65% methyl alcohol. M. 178°. Mixed melting point with cis-androsterone prepared from epi-cholestanol showed no depression. Mixed melting point with trans-androsterone gave a depression of 36°.

Analysis: Calc. for $C_{19}H_{30}O_2$. C, 78.6, H, 10.4. Found C, 78.2, H, 10.4.

What I claim as my invention is:

1. The process for the production of cis-androsterone which comprises treating trans-androsterone with a halogen compound capable of converting the 3-hydroxy group of the trans-androsterone into a 3-halogeno-group with simultaneous steric inversion, and hydrolyzing the resulting α-halogeno androsterone to cis-androsterone.

2. The process for the production of cis-androsterone which comprises treating trans-androsterone with a thionyl halide to produce an α-halogeno androsterone, and hydrolyzing the latter to cis-androsterone.

3. The process for the production of cis-androsterone which comprises treating trans-androsterone with thionyl chloride to produce α-chloro androsterone, and hydrolyzing the latter to cis-androsterone.

RUSSELL EARL MARKER.